Patented Nov. 17, 1925.

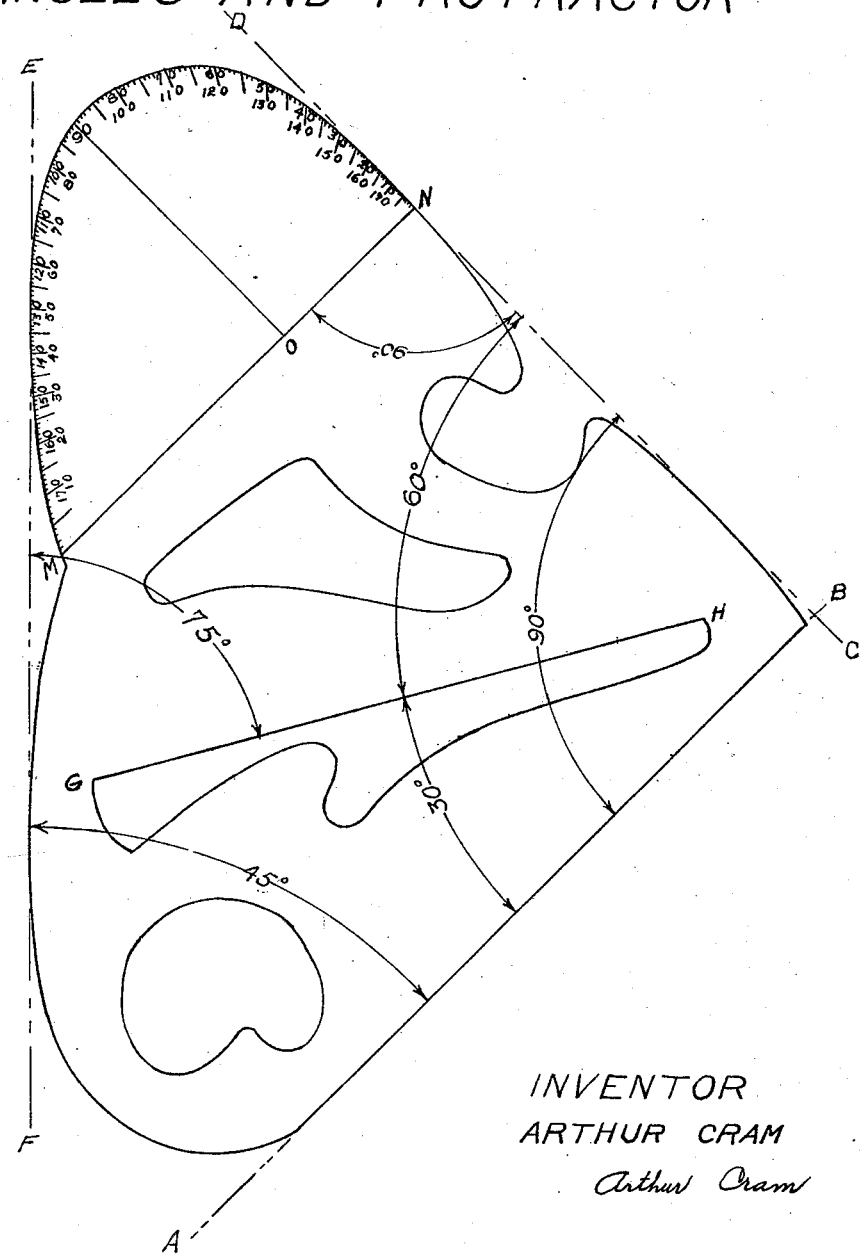

1,561,462

UNITED STATES PATENT OFFICE.

ARTHUR CRAM, OF REDFIELD, SOUTH DAKOTA.

DRAFTING INSTRUMENT.

Application filed December 29, 1924. Serial No. 758,640.

*To all whom it may concern:*

Be it known that I, ARTHUR CRAM, a citizen of the United States, residing at Redfield, in the county of Spink and State of South Dakota, have invented a new and useful Drafting Instrument, of which the following is a specification.

The invention relates to improvements in drafting instruments, from which the combined uses of the thirty-sixty-ninety degree triangle, forty five-ninety degree triangle, irregular curves, and protractor may be obtained. The object of the improvement is to obtain an instrument which will serve the purposes of the four above mentioned instruments ordinarily needed by every draftsman. Inasmuch as the angles of thirty, forty-five, sixty, seventy-five, and ninety degrees are the most used, and only necessary angles to the draftsman, the instrument is designed to give these five angles. If so desired, the instrument may be so constructed as to include, in addition to the uses of the above mentioned instruments, the uses of one other triangle, such as the twenty-two and a half, sixty-seven and a half, ninety degree triangle.

The accompanying drawing, shows the shape of the instrument, looking directly at one face of the same. The instrument, as is the case with all the instruments of its nature before mentioned, is to be made of a single piece of any suitable material, preferably transparent matter such as celluoid, amber, or glass, and is to be made in the form of a thin plate of material cut in the general shape shown in the accompanying drawing.

The entire instrument is to be so constructed that its shape describes substantially a right isosceles triangle; that is, the three straight lines, A—B, C—D, and E—F, drawn tangent to the sides of the figure should form a right isosceles triangle.

The slot which is cut diagonally within the instrument should be at such an angle, that the straight side G—H will form a thirty degree angle with the base A—B, sixty degree angle with the perpendicular side, C—D, and a seventy five degree angle with the hypothenuse, E—F, of the circumscribed right isosceles triangle.

Said slot may be made with one side a straight line, and the other side in the form of an irregular curve, as shown by the drawing.

The protractor is to be marked off on any large and suitable curve of the instrument, but preferably as shown, with its base line M—N, parallel to the base of the instrument, A—B, this will enable the draftsman to rest the base A—B, against any straight edge, and the base of the protractor will then lie parallel to said straight edge.

The protractor should be constructed in standard form, i. e., in such a way as to enable the draftsman to measure angles from the point O, placing the instrument so that one line of the angle falls on the base line M—N, and the vertex of the angle at O, and figures around the edge of the protractor will measure the angle directly—one set of figures measuring angles clockwise from M—N, the other set of figures measuring angles counterclockwise from M—N.

All lines shown on the protractor are to be marked on the instrument; this marking includes lines M—N and O—90, as well as the figures and graduations around the curve M—N. The marking should be done in such a way as not to interfere with the use of the curve as a guide for a pencil or ruling pen.

The instrument may be made without the protractor graduation.

The curves, which are shown by the drawing to comprise a large portion of the edges of the instrument, are to be irregular curves, of varying curvature, and should be so constructed as to give the greatest possible number of different curves.

As the curves are not necessary to the use of the angles of the instrument, the instrument may be made with all sides straight lines, if curves are not desired.

To secure angles of thirty degrees, the instrument is to be placed so that the base line, A—B, lies parallel to, or coincides with a given line, then the edge G—H will lie at an angle of thirty degrees with said line.

To secure angles of forty-five degrees, place the instrument so that E—F lies parallel to, or coincides with a given line, and the base, A—B, will then be at an angle of forty-five degrees with said line.

To secure angles of sixty degrees, place the instrument so that C—D lies parallel to, or coincides with a given line, and the edge G—H will lie at an angle of sixty degrees with said line.

To secure angles of seventy-five degrees, place the instrument so that E—F lies parallel to, or coincides with a given line, and the edge G—H will lie at an angle of seventy-five degrees with said line.

To secure angles of ninety degrees place the instrument so that C—D lies parallel to, or coincides with a given line, and the base, A—B, will lie at an angle of ninety degrees with said line.

Any of the above mentioned angles may be obtained either clockwise, or counter clockwise, by reversing the instrument.

I am aware that prior to my invention numerous combinations of irregular curves have been in use, therefore I do not claim the exact system of curves, but

I claim:

1. A drafting triangle comprising a thin sheet of material having one side substantially straight, the other two sides each comprising a plurality of irregular curves, whereby a common tangent to the two outer curves of each set will define the corresponding side of the triangle, and make a predetermined angle with the straight side, and the other tangent.

2. A triangle as in claim 1, said sheet having cut out portions whose edges form irregular curves at least one of said portions having also a straight edge making a predetermined angle with the straight side of said triangle and the two tangents which determine the other two sides.

ARTHUR CRAM.